US009535758B2

(12) United States Patent
Hsia et al.

(10) Patent No.: US 9,535,758 B2
(45) Date of Patent: Jan. 3, 2017

(54) MANAGING DATA DISTRIBUTION TO NETWORKED CLIENT COMPUTING DEVICES

(71) Applicant: International Business Machines Corporation, Armonk, NY (US)

(72) Inventors: Wei-Fong Hsia, Markham (CA); Xiaozeng Jiang, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/018,479

(22) Filed: Sep. 5, 2013

(65) Prior Publication Data

US 2015/0067097 A1  Mar. 5, 2015

(51) Int. Cl.
*G06F 15/16* (2006.01)
*G06F 9/50* (2006.01)
*H04L 12/911* (2013.01)
*G06Q 10/06* (2012.01)

(52) U.S. Cl.
CPC ....... *G06F 9/5027* (2013.01); *G06Q 10/06311* (2013.01); *H04L 47/70* (2013.01)

(58) Field of Classification Search
None
See application file for complete search history.

(56) References Cited

U.S. PATENT DOCUMENTS

| 7,584,278 | B2 * | 9/2009 | Rajarajan | G06F 9/4443 707/999.01 |
| 8,140,578 | B2 | 3/2012 | Johnson et al. | |
| 8,527,645 | B1 * | 9/2013 | Proffit | G06F 9/505 709/229 |
| 9,075,659 | B2 * | 7/2015 | Barzel | H04L 43/08 |
| 2002/0078028 | A1 * | 6/2002 | Lisanke | G06F 9/5027 |
| 2005/0015511 | A1 | 1/2005 | Izmailov et al. | |
| 2006/0075079 | A1 * | 4/2006 | Powers et al. | 709/220 |
| 2006/0167890 | A1 | 7/2006 | Miller et al. | |
| 2008/0066072 | A1 * | 3/2008 | Yurekli | G06Q 10/06 718/104 |
| 2009/0025004 | A1 * | 1/2009 | Barnard et al. | 718/104 |
| 2010/0114948 | A1 | 5/2010 | Shrivastava et al. | |
| 2010/0138830 | A1 | 6/2010 | Astete et al. | |
| 2011/0022694 | A1 | 1/2011 | Dalal et al. | |
| 2011/0022695 | A1 | 1/2011 | Dalal et al. | |
| 2011/0119748 | A1 | 5/2011 | Edwards et al. | |
| 2011/0251896 | A1 * | 10/2011 | Impollonia et al. | 705/14.55 |

OTHER PUBLICATIONS

Akkerman, et al., "Infrastructure for Automatic Dynamic Deployment of J2EE Applications in Distributed Environments", CIMS Technical Report: TR2005-867, 2005.

* cited by examiner

*Primary Examiner* — Thomas Dailey
(74) *Attorney, Agent, or Firm* — Bryan D. Wells; Maeve M. Carpenter

(57) ABSTRACT

A method for managing data distribution within a networked computing environment, the method including receiving one or more tasks and associated task priorities. The method includes determining a current resource allocation for a plurality of computing devices within the networked computing environment. The method includes determining, based, at least in part, on the received task priorities and the current resource allocation, at least one of the plurality of computing devices to assign as a source computing device, and sending at least one of the one or more tasks to the at least one source computing device.

20 Claims, 4 Drawing Sheets

MANAGING DATA DISTRIBUTION TO NETWORKED CLIENT COMPUTING DEVICES

FIELD OF THE INVENTION

The present invention relates generally to the field of computer-based training, and more particularly to managing data distribution to networked client computing devices.

BACKGROUND OF THE INVENTION

The deployment of large amounts of information and data, such as virtual machine images, text documents, presentations, and software updates, in the educational delivery field is necessary but often inefficient and unreliable. Data deployment includes getting new software or hardware up and running properly in its environment, including installation, configuration, running, testing, and making necessary changes. In computer-based training sessions, the data is not always deployed to the client or student computing devices on time or deployed accurately, and this problem only increases when a large number of computing devices are included and large amounts of data need to be deployed. Deployment of information between computing devices can also be done through peer-to-peer networks. Peer-to-peer networking is a distributed application architecture that partitions tasks or work loads between peers. Peers are able to make a portion of their resources available to other networked devices without central coordination by servers or stable hosts.

SUMMARY

Embodiments of the present invention disclose a method, computer program product, and computer system for managing data distribution in a networked computer environment. The method includes receiving, by one or more computer processors, one or more tasks and associated task priorities. The method includes determining, by the one or more computer processors, a current resource allocation for a plurality of computer devices within the networked computing environment. The method includes determining, by the one or more computer processors, based, at least in part, on the received task priorities and the current resource allocation, at least one of the plurality of computing devices to assign as a source computing device. The method then includes sending, by the one or more computer processors, at least one of the one or more tasks to the at least one source computing device.

DETAILED DESCRIPTION

Figure 1:
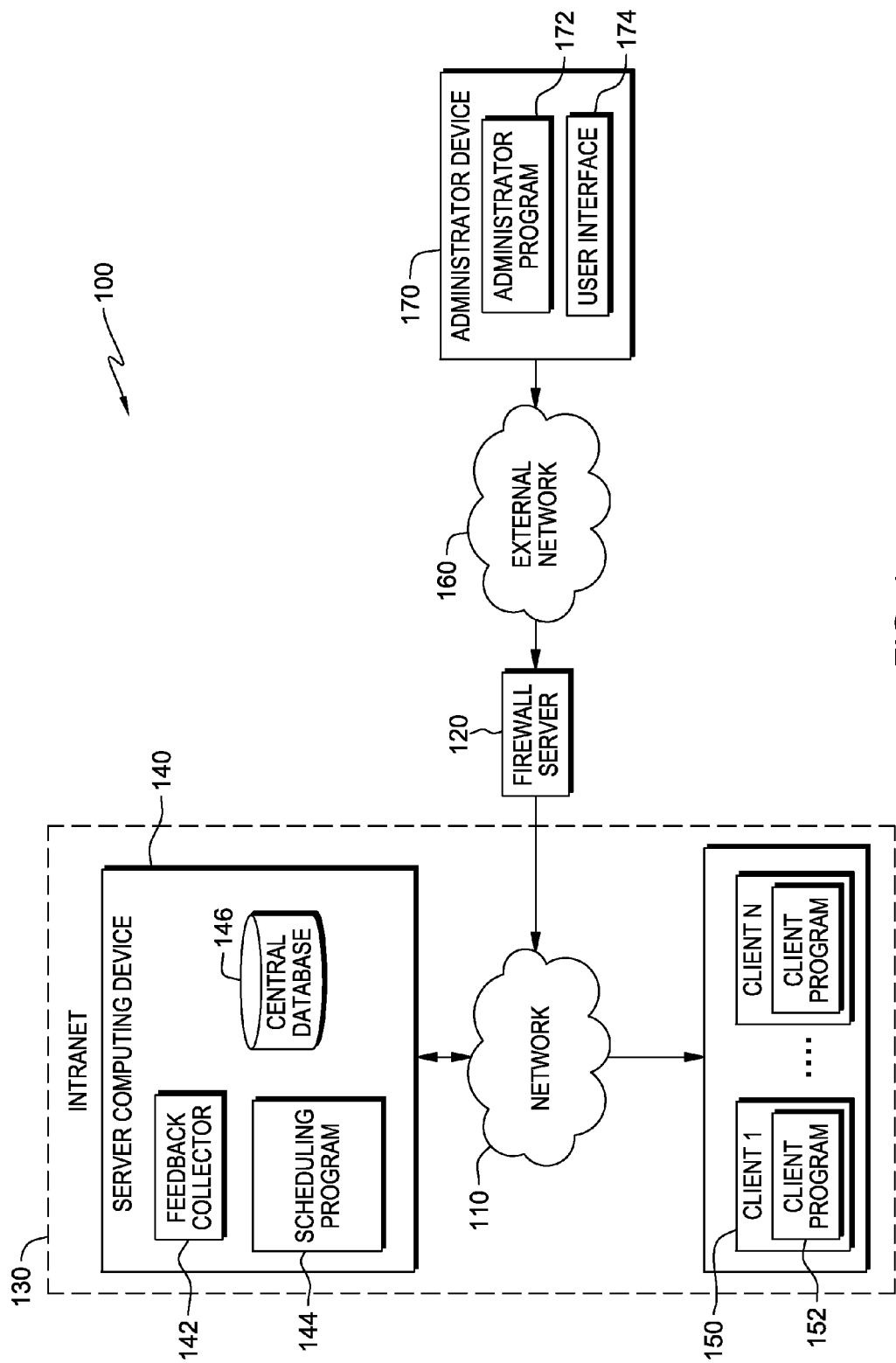
FIG. 1 is a functional block diagram illustrating a distributed data management environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable storage media may be utilized. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data management environment, generally designated 100, in accordance with one embodiment of the present invention. In various embodiments of the present invention, distributed data management environment 100 may represent an educational or training environment where information and data, including software updates, virtual machine images, or data packages, all of varying size and quantity, are distributed across one or more classrooms containing multiple computing devices in each education or training session.

Embodiments of the present invention recognize that data may be assigned to one or more client computing machines, designated as source machines, within a group of client computing machines, such as within a classroom. The source client computing machines can then share the data via peer-to-peer sharing with other client computing machines within the classroom. Data deployed through this method allows for much quicker and more accurate deployment of information.

Distributed data management environment 100 includes intranet 130, within which server computing device 140 and client computing machines 150 operate. Server computing device 140 and client computing machines 150 are protected by firewall server 120. Distributed data management environment 100 also includes external network 160 and administrator device 170. Server computing device 140 and client computing machines 150 communicate via internal network 110 within intranet 130. Administrator device 170 can connect, via external network 160, through firewall server 120 to the internal network 110.

Internal network 110 is used to share information, operational systems, or computing services within an organization and can be, for example, an intranet, a local area network (LAN), a wide area network (WAN), or a combination of the three, and can include wired, wireless, or fiber optic connections. In general, internal network 110 can be any combination of connections and protocols that will support communications between server computing device 140 and client computing machines 150 within intranet 130 and is protected by firewall server 120.

Firewall server 120 acts as a monitor for information exchange and network traffic between external network 160 and internal network 110. Firewall server 120 acts to protect resources of intranet 130, and internal network 110, from access via other networks, such as external network 160, and to control access the internal network users have to the external network resources. Firewall server 120 can be a dedicated computer processor or server computer configured to control network traffic between internal network 110 and external network 160. To further control network traffic by ensuring communication is transmitted between intended devices only, server computing device 140 and firewall server 120 are each connected to a network switch (not shown) which is in turn connected to other network switches in intranet 130, including network switches (not shown) connected to client computing machines 150.

Intranet 130 includes server computing device 140 and client computing machines 150, interconnected via internal network 110. Server computing device 140 includes feedback collector 142, scheduling program 144, and central database 146. Feedback collector 142 gathers information from client computing machines 150 for other components of the overall environment to use. For example, the information gathered by feedback collector 142 can be used for updating central database 146 with information on how long download tasks take to complete, which can be displayed for a user; or which client machines have gone offline so that scheduling program 144 can avoid assigning new tasks to those machines before they are restored; or which client machines have completed tasks and are ready to receive new tasks, such as acting as a data source for peer-to-peer sharing. In various embodiments of the present invention, gathered information can be the progress of an ongoing task, task execution results, updates on package download status, and machine network connectivity statuses.

Scheduling program 144 schedules, monitors, and manages tasks being distributed and performed in distributed data management environment 100. Tasks can include issuing packages to, or removing packages from, client computing machines 150, allocating resources and executing commands to perform a task. Packages can include data such as virtual machine images, text documents, presentations, or software updates and can be stored in central database 146. In various other embodiments of the present invention, packages may be stored on one or more dedicated storage servers located within intranet 130 and accessible by server computing device 140 via internal network 110.

Scheduling program 144 runs within distributed data management environment 100 on an iterative basis to send tasks to client computing machines 150, check for idle or offline client computing machines 150, and allocate sources for tasks based on task priority and system workload. In an exemplary embodiment of the present invention, the iterative basis for scheduling program 144 is a user defined interval. In various embodiments of the present invention, scheduling program 144 receives updates, for example, from feedback collector 142 or from client computing machines 150, and can update central database 146 when a task, such as a download task, is completed. Scheduling program 144 manages distribution and monitoring of tasks based on task priorities, scheduled sessions, current workload and resource allocation on a per client computing machine basis and can designate groups of client computing machines 150 as target machines to download tasks and packages via peer-to-peer sharing. Scheduling program 144 can additionally assign client computing machines 150 to be source machines to receive tasks and packages from server computing device 140 directly, to then distribute the tasks and packages to designated target machines within a group or a classroom. Scheduling program 144 assigns source machines to receive data from server computing device 140 and designates target machines to which the data is relayed in order to control the number of client computing machines 150 downloading data at one time.

Central database 146 stores all data required by both server computing device 140 and client computing machines 150. In various embodiments of the present invention, required data can be information regarding machines required or available, scheduled sessions, available classrooms, data packages, and tasks to be performed. While in FIG. 1, central database 146 is included within server computing device 140, one of skill in the art will appreciate that central database 146 can also be located on a single server, a dedicated storage server, or on a set of servers, within intranet 130.

Server computing device 140 may include data storage or function as part of the World Wide Web (WWW), via firewall server 120, and can include spreadsheets, presentations, web browser pages or other documents and data that can be searched for and downloaded to client computing machines 150 for viewing by a user. Server computing device 140 can be a laptop computer, a tablet computer, a netbook computer, a personal computer (PC), a desktop computer, a personal digital assistant (PDA), a smart phone, or any programmable electronic device capable of communicating with client computing machines 150 and firewall server 120 via internal network 110, administrator device 170 via external network 160 and with various components and devices within distributed data management environment 100. In various embodiments of the present invention, server computing device 140 may represent a computing system utilizing clustered computers and components to act as a single pool of seamless resources when accessed through a network. In various other embodiments of the present invention, server computing device 140 may be a storage server. While in FIG. 1, server computing device 140 is shown as a single server; one of skill in the art will appreciate that the functions and capabilities of server computing device 140 may take place on multiple servers. Server computing device 140 may contain internal and external components, as depicted and described in further detail with reference to FIG. 4.

In various embodiments of the present invention, client computing machines 150, shown in FIG. 1 as Client 1 to Client N, can be laptop computers, tablet computers, netbook computers, personal computers (PC), desktop computers, personal digital assistants (PDA), smart phones, or any programmable electronic device capable of communicating with server computing device 140 via internal network 110 and within intranet 130. Each of client computing machines 150 can be connected and can communicate with each other, for example, via peer to peer sharing within a classroom or training session, and with server computing device 140 via internal network 110. Client computing machines 150 each contain client program 152, which receives new tasks from scheduling program 144, records the tasks on client computing machine 150, executes the tasks, sends status updates to feedback collector 142 and removes completed tasks from client computing machines 150. Each of client computing machines 150 may be assigned as a source machine, for receiving a task, for example, downloading a data package, from scheduling program 144, or as a target machine, for downloading tasks and packages from the source machine or another target machine. In an exemplary embodiment of the present invention, the target machine has no direct access via internal network 110 to server computing device 140, and receives information and data from assigned source machines, for example via peer-to-peer sharing. In various embodiments of the present invention, and based on performance of the hardware within distributed data management environment 100, an assigned source machine may not be assigned another download task, or assigned as a target machine, until a current download task is complete. Additionally, client computing machines 150 connected to a same network switch distribute data among themselves prior to distributing data to client machines on another network switch within intranet 130.

External network 160 can be, for example, a local area network (LAN), a wide area network (WAN) such as the Internet, or a combination of the two, and can include wired, wireless, or fiber optic connections. In general, external network 160 can be any combination of connections and protocols that will support communications between firewall server 120 and administrator device 170.

Administrator device 170 can be a laptop computer, a tablet computer, a netbook computer, a PC, a desktop computer, a PDA, a smart phone, or any programmable electronic device capable of communicating with other devices within distributed data management environment 100 via external network 160. In various embodiments of the present invention, administrator device 170 may be included within intranet 130. Administrator device 170 contains administrator program 172 and user interface (UI) 174. In an exemplary embodiment of the present invention, administrator program 172 may be used by a user of administrator device 170 to provide a user with a real-time overview, via UI 174, of distributed data management environment 100, such as network connectivity and bandwidth usage status, association of machines and packages, latest status of all tasks, download progress of data and packages, and deployment schedule of data and packages. In various other embodiments of the present invention, a user of administrator device 170 can view schedule and status information for distributed data management environment 100 via a web browser or some other display on UI 174.

Administrator program 172 allows a user of administrator device 170, for example, an administrator, manager, or other user with access and responsibility within distributed data management environment 100, to customize and control how data is distributed and shared from server computing device 140 to client computing machines 150 and among client computing machines 150. A user of administrator device 170 can determine tasks to be distributed, schedule and manage sessions within which to disperse data, and assign priorities for data and package downloading on client computing machines 150. Administrator program 172 allows tasks to be distributed on either individual client computing machines 150, or sessions and tasks may be scheduled and managed across a set of client computing machines 150, for example, within a classroom. UI 174 may be, for example, a graphical user interface (GUI) or a web user interface (WUI) and can display text, documents, web browser windows, user options, application interfaces and instructions for operation.

Figure 2:
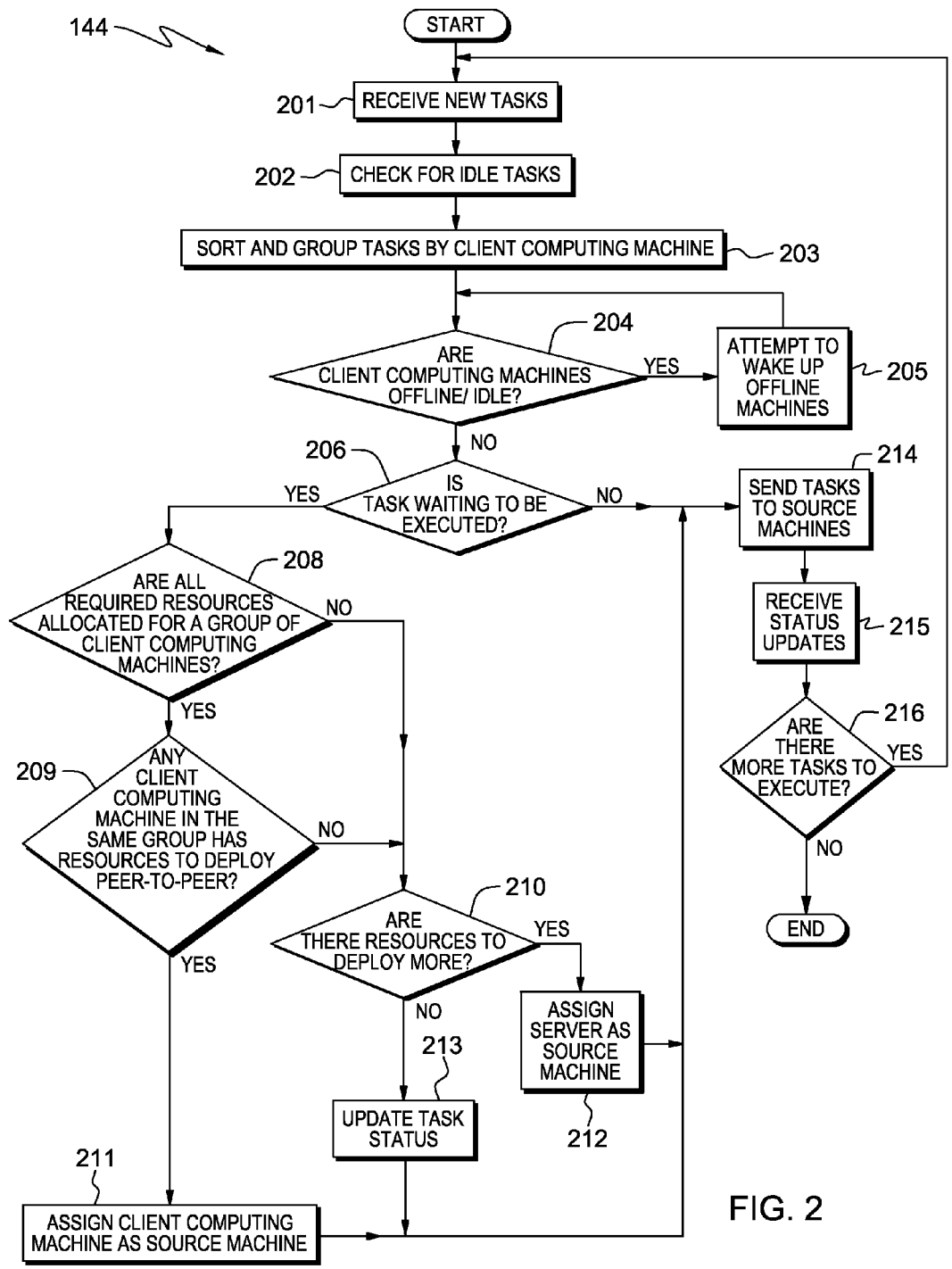
FIG. 2 is a flowchart depicting operational steps of a scheduling program for scheduling, computing system resources, and monitoring all tasks being performed in the distributed data management environment, in accordance with an embodiment of the present invention.

FIG. 2 is a flowchart depicting operational steps of a scheduling program for scheduling, computing system resources, and monitoring all tasks being performed in the distributed data management environment, in accordance with an embodiment of the present invention.

Scheduling program 144 receives new tasks and task priorities from administrator device 170 (step 201). Tasks may be downloading or removing packages from client computing machines 150 and executing commands to perform tasks. Packages may include, for example, virtual machine images, text documents, presentations, or software updates and are stored in central database 146. Task priorities can be assigned to different tasks and packages by administrator program 172 depending on a deployment schedule. For example, if session A starts before session B, administrator program 172 ensures that the package requirements for session A are fulfilled before those of session B. In an exemplary embodiment of the present invention, scheduling program 144 receives tasks and task priorities for client computing machines 150 within a single classroom. In various other embodiments of the present invention, scheduling program 144 receives task and task priorities for client computing machines 150 across a computer-based training facility.

Using the received task priorities, scheduling program 144 can allocate resources for tasks based on a number of "seeds" assigned to a classroom, as received from administrator device 170. Seeds are dedicated connections, or source machines, of client computing machines 150 to which scheduling program 144 may send tasks, including download tasks. Scheduling program 144 distributes tasks to designated seeds in a round-robin fashion so that client machines in the same grouping, or set, can begin sharing the tasks peer-to-peer. A grouping, or set, of client machines is those client computing machines 150 within the same classroom, or training session room. For example, a classroom containing 50 client computing machines 150 may be assigned five seeds, or five source machines, so that once scheduling program 144 has distributed download tasks to the five seeds, the other client machines, or target machines, may begin downloading the tasks from the seeds rather than from server computing device 140.

Scheduling program 144 checks for idle tasks (step 202). Idle tasks, for example, can be tasks that remain uncompleted from a prior iteration of scheduling program 144. Scheduling program 144 sorts and groups all uncompleted tasks, including any idle tasks and new received tasks, by client computing machine (step 203). Tasks are sorted based on received priority, and grouped based on the client computing machine within a group of client computing machines 150 to which the tasks are scheduled to be sent, according to the received task priorities and any designated seeds, or source machines.

Scheduling program 144 determines if any client computing machines are offline or idle (decision block 204). If scheduling program 144 determines client computing machines 150 are offline or idle (decision block 204, yes branch), the program attempts to wake up the offline or idle client computer machine 150 (step 205). In various embodiments of the present invention, scheduling program 144 notes any client computing machines 150 that are offline, and scheduling program 144 may, for example, send a message regarding idle or offline machines to feedback collector 142, or scheduling program 144 may send the message directly to administrator program 172.

If scheduling program 144 determines that any client computing machines 150 are online (decision block 204, no branch), the program determines if a "data task" is waiting to be executed (decision block 206). A data task may be, for example, a download task, including, for example, issuing packages to client computing machines 150, where the packages can include virtual machine images, text documents, presentations, or software updates. If scheduling program 144 determines a data task is not waiting to be executed (decision block 206, no branch), for example, the task is not a data deployment, or a download task, the program sends tasks to designated source machines (step 214). Client computing machines 150 can be designated as source machines based on a schedule, or on priority, as determined by a user of administrator device 170. Non-data deployment, or non-download tasks sent to designated source machines may include removing packages from client computing machines 150 or executing commands or updates unrelated to the received tasks.

If scheduling program 144 determines a data task is waiting to be executed (decision block 206, yes branch), for example, a session is scheduled to start, a source machine has not yet been designated, or an assigned client computing machine is busy, scheduling program 144 determines if all required resources are allocated for a group of client computing machines (decision block 208). If scheduling program 144 determines the required resource allocation is fulfilled for a group of client computing machines (decision block 208, yes branch), the program determines if any client computing machine 150 within the group has resources to deploy data peer-to-peer (decision block 209). For example, if network connectivity among a group of client computing machines 150 is stronger than the network connection between the client computing machines 150 and the server computing device 140, then the client computing machines 150 can deploy data peer-to-peer. If scheduling program 144 determines any client computing machine 150 within the group has resources to deploy data peer-to-peer (decision block 209, yes branch), the program assigns the client computing machine as a source machine (step 211). Scheduling program 144 monitors each of client computing machines 150 to keep track of which machine is doing what at a given time, allowing scheduling program 144 to determine resources available within intranet 130.

In an embodiment of the present invention, scheduling program 144 can reset the data source for deployment for download tasks that are waiting, e.g., not currently being executed. For example, in a first iteration, or user defined interval, scheduling program 144 assigns a first client computing machine 150 as a target machine to download a package via peer-to-peer sharing from a second client computing machine 150, but the second client computing machine 150 is currently busy transferring data to a third machine. The first client computing machine 150 waits, and becomes idle. In a second iteration, or user defined interval, scheduling program 144 determines a fourth client computing machine 150 is available, and has the package that the first client computing machine 150 is to get. Scheduling program 144 can reset the data source for the first client computing machine to begin downloading from the available fourth client computing machine 150.

If scheduling program 144 determines the required resources are not allocated for a group of client computing machines 150 (decision block 208, no branch), for example, a source machine has not been designated, or the required download task package is not available, the program determines if there are more resources to deploy tasks (decision block 210). If scheduling program 144 determines there are not resources to deploy tasks (decision block 210, no branch), the program updates the task status (step 213). For example, scheduling program 144 sets tasks as idle, indicating the tasks can not be performed, and the program will update the task status during its next iteration, or user defined interval. A user defined interval is a length of time designated by a user for how often scheduling program 144 will run.

If scheduling program 144 determines there are no resources within the group to deploy data peer-to-peer (decision block 209, no branch), the program determines if there are resources to deploy tasks (decision block 210). If scheduling program 144 determines there are resources to deploy tasks, for example, a network connection exists, (decision block 210, yes branch), the program assigns a server as a source machine (step 212). In one embodiment, the server may be server computing device 140. In another embodiment, the server may be any other server within distributed data management environment 100. Once scheduling program 144 has assigned a server as a source machine, the program sends tasks to the source machine (step 214).

Scheduling program 144 sends tasks to source machines (step 214). In an exemplary embodiment, scheduling program 144 sends tasks to each of client computing machines 150, or one or more server computing devices, that have been allocated as a source machine. Tasks may be distributed to an individual machine, or a set of machines in a round robin manner. In various embodiments of the present invention, scheduling program 144 can send tasks as it runs in a loop of a user-defined interval, or scheduling program 144 can send new tasks to client computing machines 150 as it receives updated tasks from administrator device 170.

Scheduling program 144 receives status updates (215). Each of client computing machines 150 designated as a source machine, or any server designated as a source machine, sends updates regarding whether the tasks were completed successfully, or failed, and the errors that caused the failure. In various embodiments of the present invention, status updates may be received by feedback collector 142 and then communicated to scheduling program 144 or administrator device 170.

Scheduling program 144 determines if there are more tasks to execute (decision block 216). If the program determines there are more tasks to execute (decision block 216, yes branch), the program returns to receive new tasks (step 201). If scheduling program 144 determines there are no more tasks to complete (decision block 216, no branch), the program ends.

Figure 3:
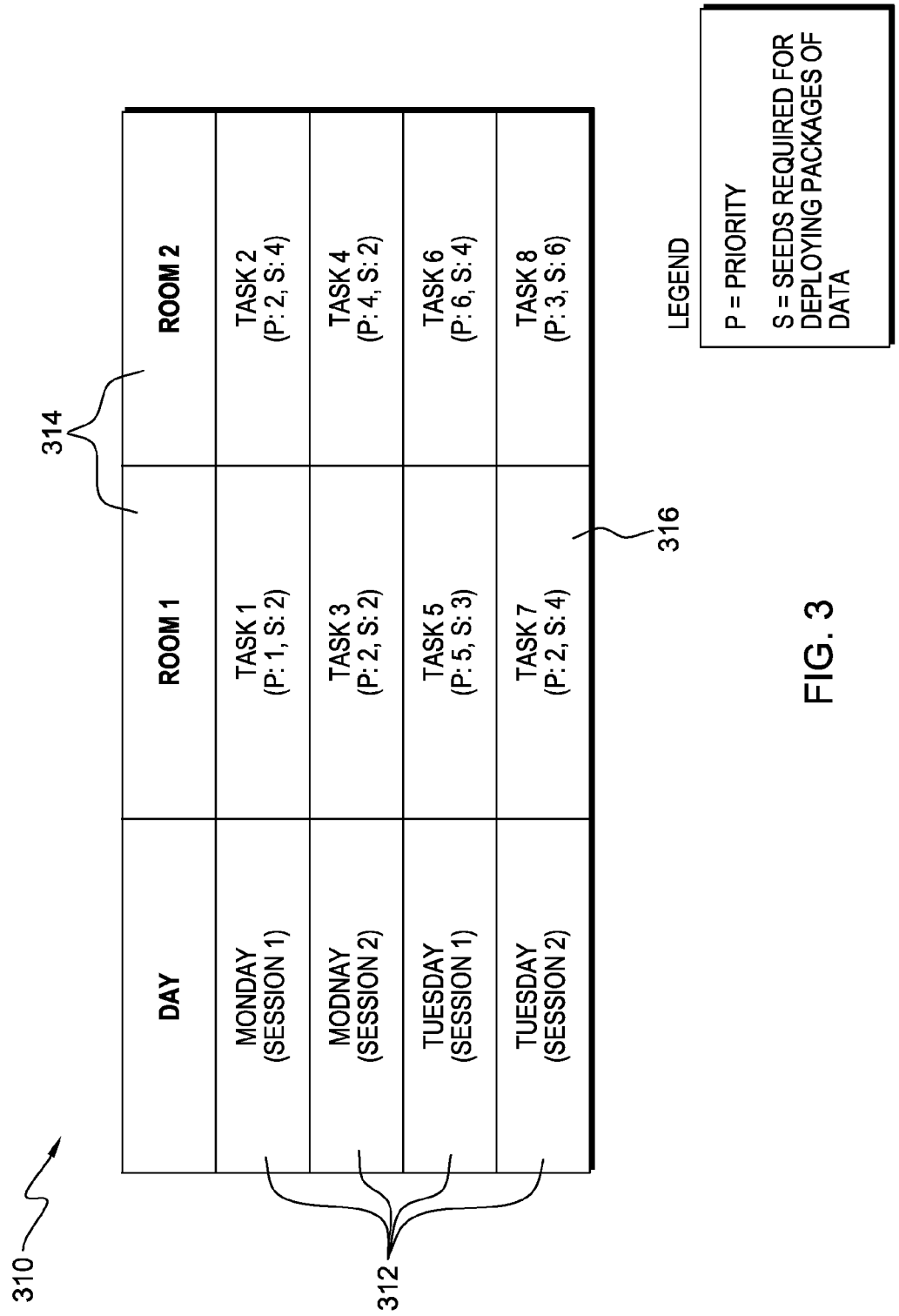
FIG. 3 illustrates an exemplary user interface for use by a user of the administrator device of FIG. 1, in accordance with an embodiment of the present invention.

FIG. 3 illustrates an exemplary user interface, such as UI 174 on administrator device 170, for use by a user of administrator device 170, in accordance with an embodiment of the present invention.

An exemplary overview, displayed on UI 174, is shown in graphical display 310. Graphical display 310 includes time display 312, room display 314, and exemplary task display 316. Time display 312 allows a user to view a day and information regarding sessions to take place on the day. Room display 314 shows which sessions are scheduled for each room and tasks required per session. Room display 314 allows a user of administrator device 170 to monitor available rooms and the schedule of required tasks to each room.

In an exemplary embodiment, information included in graphical display 310 allows a user of administrator device 170, using administrator program 172, to assign a number of seeds, or source machines, for task download in each room, and to set a priority for deployment of required tasks. For example, task display 316 may show "P: 2, S: 4," which shows that a required task, "task 7", has been assigned a priority of "2" with respect to other tasks, and that "4" seeds, or source machines, have been assigned for downloading the task.

Figure 4:
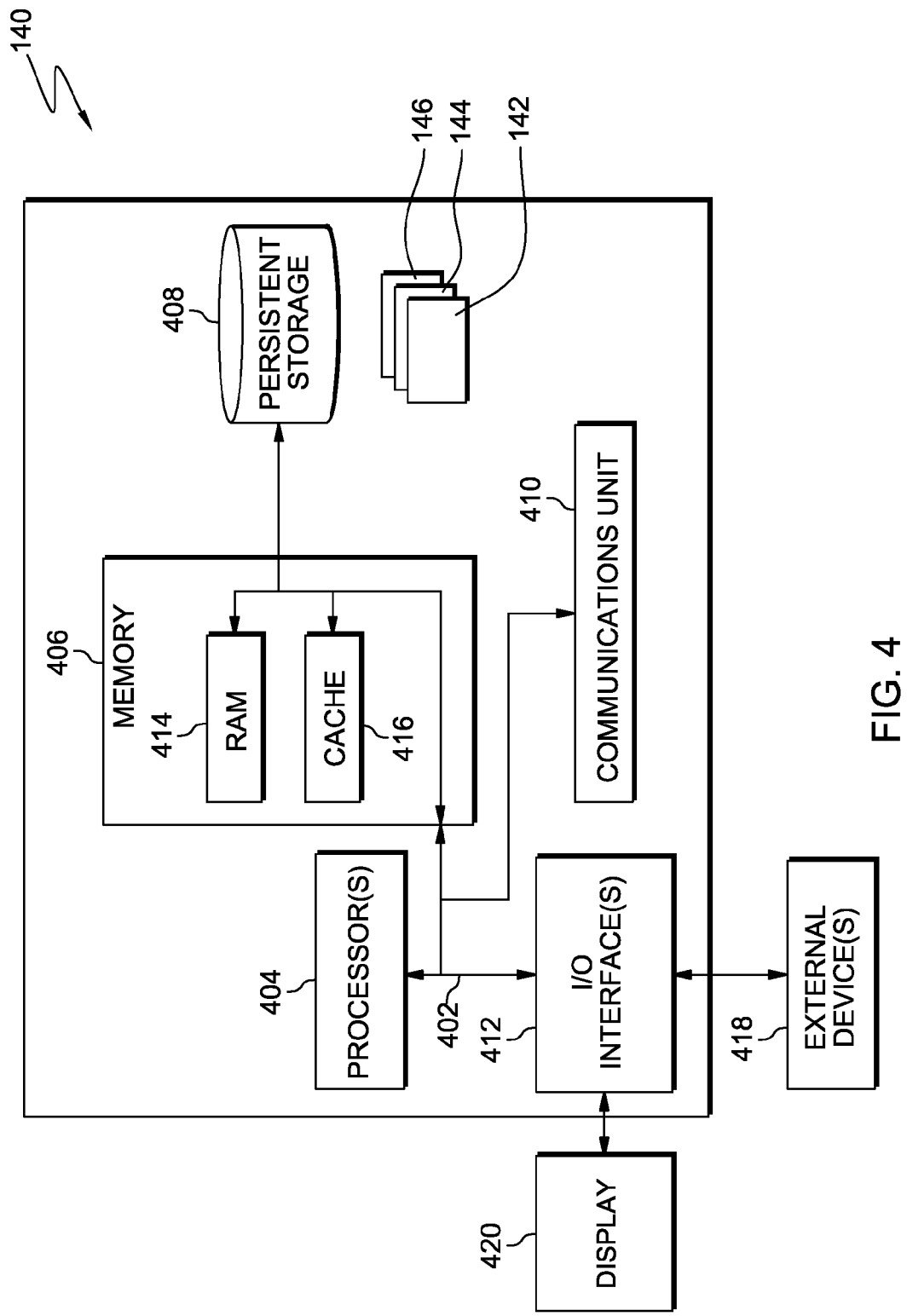
FIG. 4 depicts a block diagram of the internal and external components of a data processing system, such as the server computing device of FIG. 1, in accordance with an embodiment of the present invention.

FIG. 4 depicts a block diagram of components of server computing device 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computing device 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Feedback collector 142, scheduling program 144, and central database 146 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to, a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between server computing device 140 and client computing machines 150. In these examples, communications unit 410 includes one or more network interface cards. Communications unit 410 may provide communications through the use of either or both physical and wireless communications links. Feedback collector 142, scheduling program 144, and central database 146 may be downloaded to persistent storage 408 through communications unit 410.

I/O interface(s) 412 allows for input and output of data with other devices that may be connected to server computing device 140. For example, I/O interface 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., feedback collector 142, scheduling program 144, and central database 146, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing data distribution within a networked computing environment, the method comprising:
   receiving, at a server including one or more computer processors, one or more tasks and one or more task priorities that are respectively associated with the one or more tasks;
   determining, by the server, a current resource allocation for a plurality of computing devices within the networked computing environment;
   determining, by the server, based, at least in part, on the received task priorities and the current resource allocation, a first computing device of the plurality of computing devices to assign as a first source computing device of one or more source computing devices with respect to a first task of the one or more tasks;
   assigning, by the server, (i) a second computing device of the plurality of computing devices as a first target computing device of a plurality of target computing devices to receive data associated with the first task and (ii) a third computing device of the plurality of computing devices as a second target computing device of a plurality of target computing devices to receive the data associated with the first task, wherein:
      each target computing device of the plurality of target computing devices is assigned to download the first task of the one or more tasks from a respective source computing device of the one or more source computing devices,
      the first computing device can be assigned as a third target computing device with respect to a subsequent task of the one or more tasks, and
      one of the second computing device and the third computing device can function as a second source computing device with respect to the subsequent task of the one or more tasks; and sending, by the server, the data associated with the first task to the first source computing device.

2. The method of claim 1, wherein determining, by the server, based, at least in part, on the received task priorities and the current resource allocation, a first computing device of the plurality of computing devices to assign as a first source computing device, further comprises:
   determining, by the server, that the plurality of computing devices are connected within an internal network;
   determining, by the server, that the first computing device is currently online;
   determining, by the server, that the first computing device has available resources for downloading at least the first task from the server; and
   assigning, by the server, the first computing device as the first source computing device.

3. The method of claim 1, further comprising:
   determining, by the server, a schedule for the received one or more tasks, based, at least in part, on the received task priorities and the current resource allocation for the plurality of computing devices;
   sending, by the server, at least the first task to the first source computing device based, at least in part, on the determined schedule;
   monitoring, by the server, a status of each of the plurality of computing devices; and
   updating, by the server, the schedule, based, at least in part, on the received task priorities and the monitored status of each of the plurality of computing devices.

4. The method of claim 3, wherein the determined schedule includes one or more of: a time, a priority, a classroom, and a day for each of the received one or more tasks, and wherein the server and the plurality of computing devices are connected through an intranet network.

5. The method of claim 1, further comprising:
   determining, by the server, that the first source computing device has not performed the first task; and in response, determining, by the server, not to send the first source computing device an additional task of the one or more tasks.

6. A computer system for managing data distribution within a networked computing environment, the computer system comprising:
   one or more computer processors, including at least one computer processor configured to act as a firewall server, connected to one or more of a plurality of computing devices within a networked computing environment, the networked computing environment including an intranet;
   one or more computer-readable tangible storage device;
   program instructions stored on the one or more computer-readable tangible storage device for execution by at least one of the one or more computer processors, the program instructions comprising:
      program instructions to receive at a server one or more tasks and one or more task priorities that are respectively associated with the one or more tasks;
      program instructions to determine by the server a current resource allocation for the plurality of computing devices within the networked computing environment;
      program instructions to determine by the server, based, at least in part, on the received task priorities and the current resource allocation, a first computing device of the plurality of computing devices to assign as a first source computing device of one or more source computing devices with respect to a first task of the one or more tasks;

program instructions to assign, by the server, (i) a second computing device of the plurality of computing devices as a first target computing device of a plurality of target computing devices to receive data associated with the first task and (ii) a third computing device of the plurality of computing devices as a second target computing device of a plurality of target computing devices to receive the data associated with the first task, wherein:

each target computing device of the plurality of target computing devices is assigned to download the first task of the one or more tasks from a respective source computing device of the one or more source computing devices, the first computing device can be assigned as a third target computing device with respect to a subsequent task of the one or more tasks, and one or both of the second computing device and the third computing device can function as a second source computing device with respect to the subsequent task of the one or more tasks; and program instructions to send, by the server, the data associated with the first task to the first source computing device.

7. The computer system of claim 6, wherein the program instructions to determine by the server, based, at least in part, on the received task priorities and the current resource allocation, a first computing device of the plurality of computing devices to assign as a first source computing device, further comprise:

program instructions to determine, by the server, that the plurality of computing devices are connected within an internal network;

program instructions to determine, by the server, that the first computing device is currently online;

program instructions to determine, by the server, that the first computing device has available resources for downloading at least the first task from the server; and program instructions to assign, by the server, the first computing device as the first source computing device.

8. The computer system of claim 6, further comprising:

program instructions to determine, by the server, a schedule for the received one or more tasks, based, at least in part, on the received task priorities and the current resource allocation for the plurality of computing devices;

program instructions to send, by the server, at least the first task to the first source computing device based, at least in part, on the determined schedule;

program instructions to monitor, by the server, a status of each of the plurality of computing devices; and program instructions to update, by the server, the schedule, based, at least in part, on the received task priorities and the monitored status of each of the plurality of computing devices.

9. The computer system of claim 6, further comprising:

program instructions to determine, by the server, that the determined source computing device has not performed the first task; and in response, execute program instructions to determine, by the server, not to send the first source computing device an additional task of the one or more tasks.

10. A computer program product for managing data distribution within a networked computing environment, the computer program product comprising:

one or more computer-readable tangible storage devices and program instructions stored on the one or more computer-readable tangible storage devices, the program instructions comprising:

program instructions to receive at a server one or more tasks and one or more task priorities that are respectively associated with the one or more tasks;

program instructions to determine by the server a current resource allocation for the plurality of computing devices within the networked computing environment;

program instructions to determine by the server, based, at least in part, on the received task priorities and the current resource allocation, a first computing device of the plurality of computing devices to assign as a first source computing device of one or more source computing devices with respect to a first task of the one or more tasks;

program instructions to assign, by the server, (i) a second computing device of the plurality of computing devices as a first target computing device of a plurality of target computing devices to receive data associated with the first task and (ii) a third computing device of the plurality of computing devices as a second target computing device of a plurality of target computing devices to receive the data associated with the first task, wherein:

each target computing device of the plurality of target computing devices is assigned to download the first task of the one or more tasks from a respective source computing device of the one or more source computing devices, the first computing device can be assigned as a third target computing device with respect to a subsequent task of the one or more tasks, and one or both of the second computing device and the third computing device can function as a second source computing device with respect to the subsequent task of the one or more tasks; and program instructions to send, by the server, the data associated with the first task to the first source computing device.

11. The computer program product of claim 10, wherein the program instructions to determine by the server, based, at least in part, on the received task priorities and the current resource allocation, a first computing device of the plurality of computing devices to assign as a first source computing device, further comprise:

program instructions to determine, by the server, that the plurality of computing devices are connected within an internal network;

program instructions to determine, by the server, that the first computing device is currently online;

program instructions to determine, by the server, that the first computing device has available resources for downloading at least the first task from the server; and program instructions to assign, by the server, the first computing device as the first source computing device.

12. The computer program product of claim 10, further comprising:

program instructions to determine, by the server, a schedule for the received one or more tasks, based, at least in part, on the received task priorities and the current resource allocation for the plurality of computing devices;

program instructions to send, by the server, at least the first task to the first source computing device based, at least in part, on the determined schedule;

program instructions to monitor, by the server, a status of each of the plurality of computing devices; and program instructions to update, buy the server, the schedule, based, at least in part, on the received task priorities and the monitored status of each of the plurality of computing devices.

13. The computer program product of claim 12, wherein the determined schedule includes one or more of: a time, a priority, a classroom, and a day for each of the received one or more tasks, and wherein the server and the plurality of computing devices are connected through an intranet network.

14. The computer program product of claim 10, further comprising:

program instructions to determine, by the server, that the determined source computing device has not performed the first task; and in response, execute program instructions to determine, by the server, not to send the first source computing device an additional task of the one or more tasks.

15. The computer program product of claim 14, the program instructions further comprising:

program instructions to perform, by the server, the additional task in response to determining that none of the plurality of computing devices have resources to perform the additional task based on the current resource allocation.

16. The computer program product of claim 10, the program instructions further comprising:

program instructions to determine, by the server, that the second target computing device is idle while waiting to download the first task from the first source computing device;

program instructions to determine, by the server, that a fourth computing device of the plurality of computing devices stores the data associated with the first task;

program instructions to unassign, by the server, the first computing device as the first source computing device with respect to the second target computing device and the first task; and program instructions to assign, by the server, the fourth computing device as a third source computing device with respect to the second target computing device and the first task.

17. The method of claim 5, further comprising:

the server performing the additional task in response to determining that none of the plurality of computing devices have resources to perform the additional task based on the current resource allocation.

18. The method of claim 1, further comprising:

determining, by the server, that the second target computing device is idle while waiting to download the first task from the first source computing device;

determining, by the server, that a fourth computing device of the plurality of computing devices stores the data associated with the first task;

unassigning, by the server, the first computing device as the first source computing device with respect to the second target computing device and the first task; and assigning, by the server, the fourth computing device as a third source computing device with respect to the second target computing device and the first task.

19. The computer system of claim 9, the program instructions further comprising:

program instructions to perform, by the server, the additional task in response to determining that none of the plurality of computing devices have resources to perform the additional task based on the current resource allocation.

20. The computer system of claim 6, the program instructions further comprising:

program instructions to determine, by the server, that the second target computing device is idle while waiting to download the first task from the first source computing device;

program instructions to determine, by the server, that a fourth computing device of the plurality of computing devices stores the data associated with the first task;

program instructions to unassign, by the server, the first computing device as the first source computing device with respect to the second target computing device and the first task; and program instructions to assign, by the server, the fourth computing device as a third source computing device with respect to the second target computing device and the first task.

* * * * *